US005586378A

United States Patent [19]

Smith

[11] Patent Number: 5,586,378

[45] Date of Patent: Dec. 24, 1996

[54] BALL JOINT EXTRACTOR

[76] Inventor: Steven D. Smith, 1115 Ward St., Centralia, Wash. 98531-5047

[21] Appl. No.: 276,838

[22] Filed: Jul. 18, 1994

[51] Int. Cl.$^6$ .................................................... B23P 19/04

[52] U.S. Cl. ............................ 29/257; 269/249; 81/177.8

[58] Field of Search .............................. 29/257, 251, 270, 29/281.1, 256; 269/249; 81/177.7, 177.8

[56] References Cited

U.S. PATENT DOCUMENTS

| | | | |
|---|---|---|---|
| 1,551,907 | 9/1925 | Preston | 29/257 |
| 1,669,899 | 5/1928 | Coffer | 29/257 |
| 2,075,792 | 4/1937 | Curtiss | 29/257 |
| 2,167,897 | 8/1939 | Kulp | 29/257 |
| 2,965,958 | 12/1960 | Gribble | 29/257 |
| 3,550,486 | 12/1970 | Edwards | 81/177.8 |
| 4,406,186 | 9/1983 | Gummow | 81/177.8 |
| 5,148,590 | 9/1992 | Wu | 29/257 |

FOREIGN PATENT DOCUMENTS

| | | | |
|---|---|---|---|
| 1049797 | 1/1959 | Germany | 29/257 |

*Primary Examiner*—Robert C. Watson

[57] ABSTRACT

A ball joint extractor comprising a C-shaped clamp having an elongated vertical component at its central extent and having two horizontal parallel legs, an upper leg and a lower leg, extending from the opposite ends thereof; a fixed jaw in a U-shaped configuration having parallel legs in a horizontal orientation and a curved coupling section therebetween, the coupling section secured at its interior end to the outboard end of the upper leg, the U-shaped jaw having a horizontal lower surface and an upper surface angling downwardly from its curved coupling section with the interior surface of the U-shaped jaw being chamfered whereby the upper surface of the U-shaped jaw has a smaller surface area on its upper surface than its lower surface with the coupling section being a curve having an axis parallel with the axis of the long leg of the U-shaped member; and a cylindrical member with a threaded central aperture and an exterior surface secured at one edge to the exterior surface of the lower leg of the C-shaped clamp with the axis of the cylindrical member being co-extensive with the axis of the U-shaped member and parallel with the axis of the long leg of the C-shaped member.

1 Claim, 4 Drawing Sheets

BALL JOINT EXTRACTOR

BACKGROUND OF THE INVENTION

1. Field of the Invention

The present invention relates to ball joint extractor and more particularly pertains to separate the linkages of vehicles at the ball joints.

2. Description of the Prior Art

The use of various types of tools for specific purposes is known in the prior art. More specifically, various types of tools for specific purposes heretofore devised and utilized for the purpose of repairing various parts of automobiles with tools of a wide variety of designs and functions are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,926,537 to Pool a tie rod and ball joint separator.

U.S. Pat. No. Des. 297,402 to Williams discloses the design of a C-clamp.

U.S. Pat. No. 4,869,482 to Beccaceci discloses a tool for loosening a seized ball joint in a motor vehicle.

U.S. Pat. No. 4,582,307 to Wang discloses a C-clamp.

U.S. Pat. No. 3,791,006 to Robinson discloses a ball joint puller.

In this respect, the ball joint extractor according to the present invention substantially departs from the conventional concepts and designs of the prior art, and in doing so provides an apparatus primarily developed for the purpose of separating the linkages of vehicles at the ball joints.

Therefore, it can be appreciated that there exists a continuing need for new and improved ball joint extractor which can be used for separating the linkages of vehicles at the ball joints. In this regard, the present invention substantially fulfills this need.

SUMMARY OF THE INVENTION

In view of the foregoing disadvantages inherent in the known types of various types of tools for specific purposes now present in the prior art, the present invention provides an improved ball joint extractor. As such, the general purpose of the present invention, which will be described subsequently in greater detail, is to provide a new and improved ball joint extractor and method which has all the advantages of the prior art and none of the disadvantages.

To attain this, the present invention essentially comprises a new and improved ball joint extractor comprising, in combination, a C-shaped clamp having an elongated vertical component at its central extent and having two horizontal parallel legs, an upper leg and a lower leg, extending from the opposite ends thereof; a fixed jaw in a U-shaped configuration having parallel legs in a horizontal orientation and a curved coupling section therebetween, the coupling section secured at its interior end to the outboard end of the upper leg, the U-shaped jaw having a horizontal lower surface and an upper surface angling downwardly from its curved coupling section with the interior surface of the U-shaped jaw being chamfered whereby the upper surface of the U-shaped jaw has a smaller surface area on its upper surface than its lower surface with the coupling section being a curve having an axis parallel with the axis of the long leg of the U-shaped member, the U-shaped jaw being configured to fit around the boot area of a ball joint; a cylindrical member with a threaded central aperture and an exterior surface secured at one edge to the exterior surface of the lower leg of the C-shaped clamp with the axis of the cylindrical member being co-extensive with the axis of the U-shaped member and parallel with the axis of the long leg of the C-shaped member; and a bolt having a threaded exterior surface rotatably coupled to the threads of the cylindrical member, the upper end of the threaded bolt being formed with an enlarged disk having a spherical recess facing the U-shaped member and having a head at its lower end rotatable at the discretion of the user, the disk being shaped to contact the free end of a ball joint pin and push it through its supporting aperture.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ball joint extractor which have all the advantages of the prior art various types of tools for specific purposes and none of the disadvantages.

It is another object of the present invention to provide a new and improved ball joint extractor which may be easily and efficiently manufactured and marketed.

It is further object of the present invention to provide a new and improved ball joint extractor which are of durable and reliable constructions.

An even further object of the present invention is to provide a new and improved ball joint extractor which are susceptible of a low cost of manufacture with regard to both materials and labor, and which accordingly are then susceptible of low prices of sale to the consuming public, thereby making such ball joint extractor economically available to the buying public.

Still yet another object of the present invention is to provide a new and improved ball joint extractor which provide in the apparatuses and methods of the prior art some of the advantages thereof, while simultaneously overcoming some of the disadvantages normally associated therewith.

Still another object of the present invention is to separate the linkages of vehicles at the ball joints.

Lastly, it is an object of the present invention to provide new and improved ball joint extractor comprising a C-shaped clamp having an elongated vertical component at its central extent and having two horizontal parallel legs, an upper leg and a lower leg, extending from the opposite ends thereof; a fixed jaw in a U-shaped configuration having parallel legs in a horizontal orientation and a curved coupling section therebetween, the coupling section secured at its interior end to the outboard end of the upper leg, the U-shaped jaw having a horizontal lower surface and an upper surface angling downwardly from its curved coupling section with the interior surface of the U-shaped jaw being chamfered whereby the upper surface of the U-shaped jaw has a smaller surface area on its upper surface than its lower surface with the coupling section being a curve having an axis parallel with the axis of the long leg of the U-shaped member; and a cylindrical member with a threaded central aperture and an exterior surface secured at one edge to the exterior surface of the lower leg of the C-shaped clamp with the axis of the cylindrical member being co-extensive with the axis of the U-shaped member and parallel with the axis of the long leg of the C-shaped member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
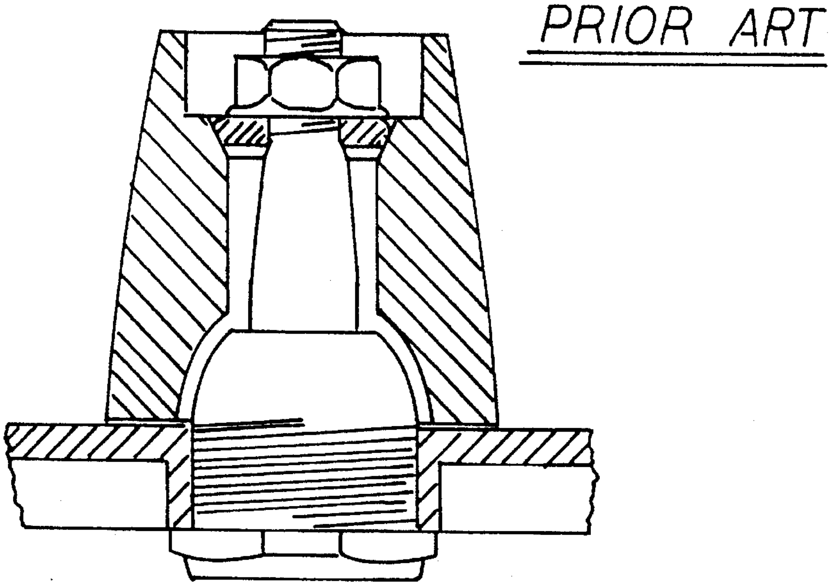
FIG 1 PRIOR ART
FIG. 1 is a cross sectional view of a component of a vehicle positioned for operation and use by nuts on a threaded component.
Figure 2:
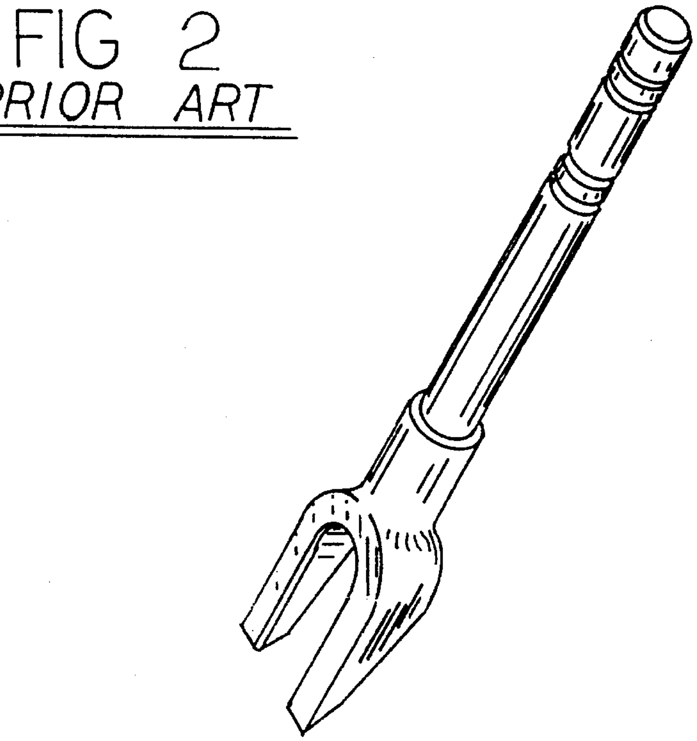
FIG 2 PRIOR ART
FIG. 2 is a fork shaped member for use as a tool in automotive repair.

With reference now to the drawings, and in particular to FIG. 1 thereof, the preferred embodiment of the new and improved ball joint extractor embodying the principles and concepts of the present invention and generally designated by the reference numeral 10 will be described.

The present invention, the new and improved ball joint extractor is comprised of a plurality of component elements. Such component elements in their broadest context, include a C-shaped clamp, a fixed U-shaped jaw, a cylindrical member and a bolt, and, in an alternate embodiments, a pivotable handle and a fixed handle. Such components are individually configured and correlated with respect to each other so as to attain the desired objectives.

The central component of the present system 10 is a C-shaped clamp 12. Such clamp has an elongated vertical component 14 at its central extent. It also has two parallel legs, an upper leg 16 and a lower leg 18. Such legs extend from the opposite ends of the vertical component.

Next provided is fixed jaw 22. The fixed jaw is in a U-shaped configuration. It has parallel legs 24. Such legs are in a horizontal orientation. A curved coupling section 26 is located between the legs. The coupling section is secured at its interior end to the outboard end of the upper leg.

The U-shaped jaw has a horizontal lower surface 30 and an upper surface parallel therewith but angling downwardly from its curved coupling section. The interior surface of the U-shaped jaw is thus chamfered. In this manner, the upper surface of the U-shaped member has a small surface area on its upper surface than on its lower surface. The coupling section is a curve having an axis parallel with the axis of the long leg or vertical component of the U-shaped member. The U-shaped jaw is configured to fit around the boot area 32 of a ball joint 34. Note FIG. 4.

Next provided is a cylindrical member 38. Such member has a threaded central aperture 40. It also has an exterior surface secured at one edge to the exterior surface of the lower leg of the C-shaped clamp. The axis of the cylindrical member is co-extensive with the axis of the U-shaped member. Such axis is parallel with the axis of the long leg or vertical component of the C-shaped member.

Figure 3:
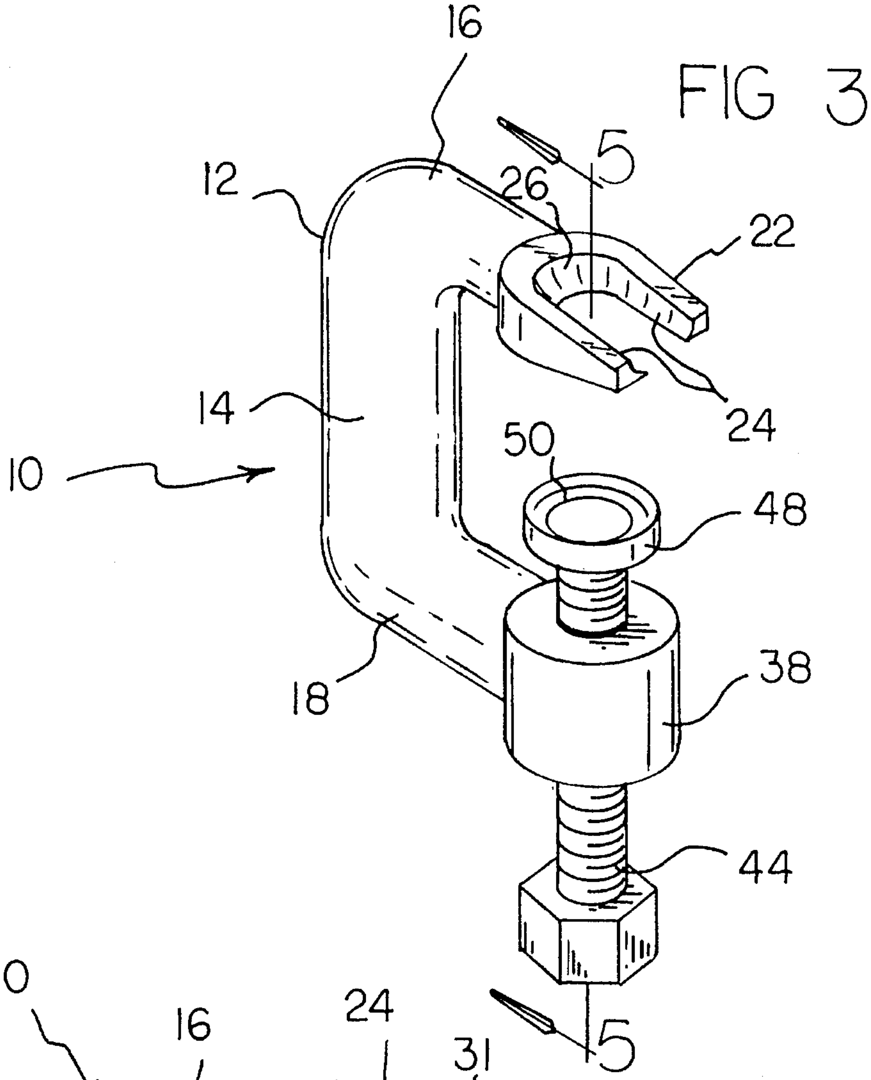
FIG. 3 is a perspective view of the preferred embodiment of the ball joint extractor constructed in accordance with the principles of the present invention.
Figure 4:
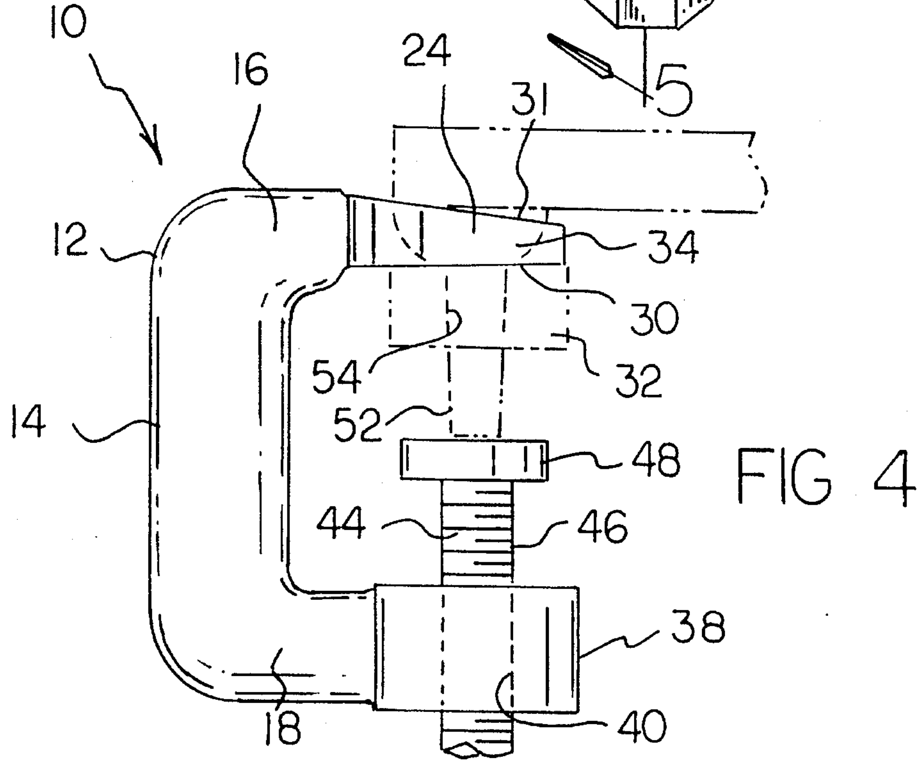
FIG. 4 is a side elevational view of the device shown in FIG. 3.
Figure 5:
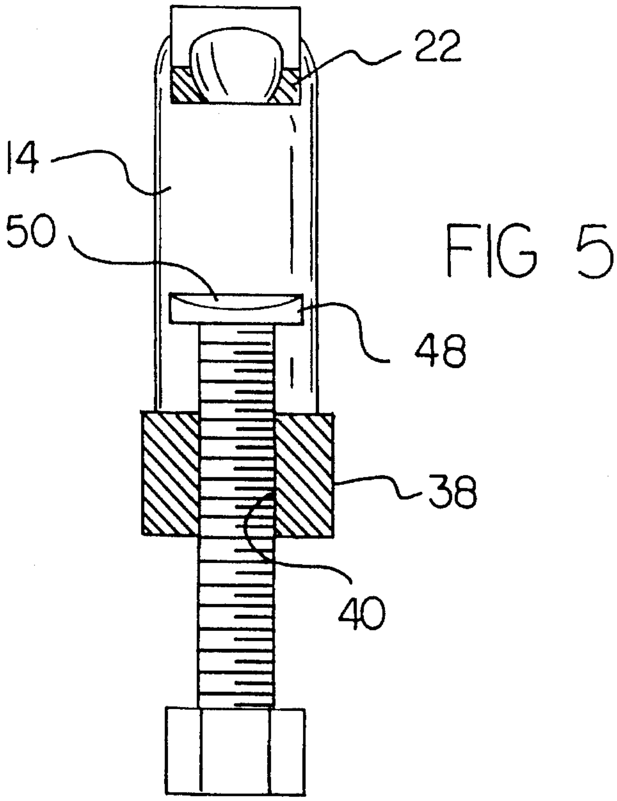
FIG. 5 is a cross sectional view taken along line 5—5 of FIG. 3.

The last component of the primary embodiment as illustrated in FIGS. 3, 4 and 5 is a bolt 44. Such bolt has a threaded exterior surface 46 at its central extent. The bolt is rotatably coupled to the threads of the cylindrical member. The upper end of the threaded bolt is formed with an enlarged disk 48. Such disk has a spherical recess 50 facing the U-shaped member. At its lower end, the threaded bolt has a head which is rotatable at the discretion of the user. The disk is shaped to contact the free end of a ball joint pin 52 and is adapted to push it upwardly through its supporting aperture 54.

Figure 6:
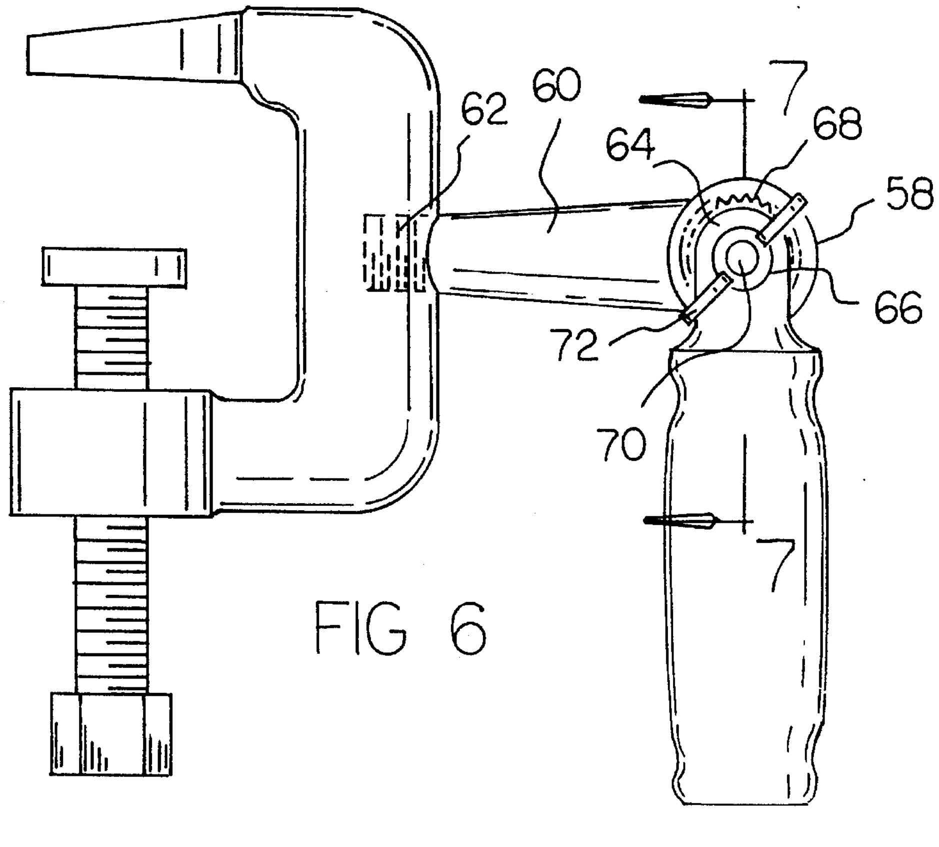
FIG. 6 is a side elevational view of the device shown in FIGS. 3, 4 and 5 but constructed in accordance with an alternate embodiment of the invention.
Figure 7:
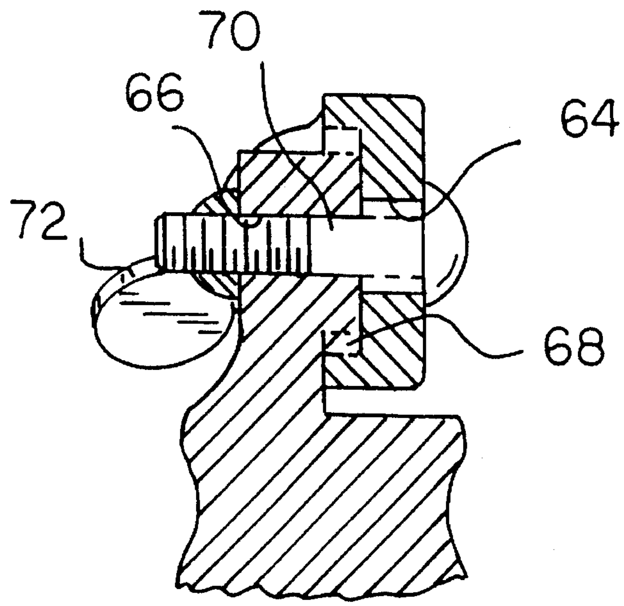
FIG. 7 is a cross sectional view taken along line 7—7 of FIG. 6.

An alternate embodiment of the invention is shown in FIGS. 6 and 7. In such alternate embodiments, an additional element is a handle component 58. The handle component has a lower end and an upper end. Secured between the handle component and the C-shaped jaw is a leg component 60. The leg component has an outboard end and a threaded interior end 62. The interior end is adapted to be threadably coupled to the central portion of the elongated vertical component through a threaded recess on the side thereof remote from its parallel legs but parallel therewith. The outboard end of the leg component is formed with an aperture 64. Such aperture is positionable to be coaxial with an aperture 66 in the upper end of the handle component. A toothed interface 68 on the upper end of the handle component and the outboard end of the leg component function with an associated bolt 70 with a wing nut 72. The bolt and wing nut are adapted to be positioned through the apertures of the handle and leg components for erecting the secure coupling therebetween. The presence of the toothed surfaces of the handle and leg components allow for the positioning of the handle and leg components at any convenient angle for a particular application.

Figure 8:
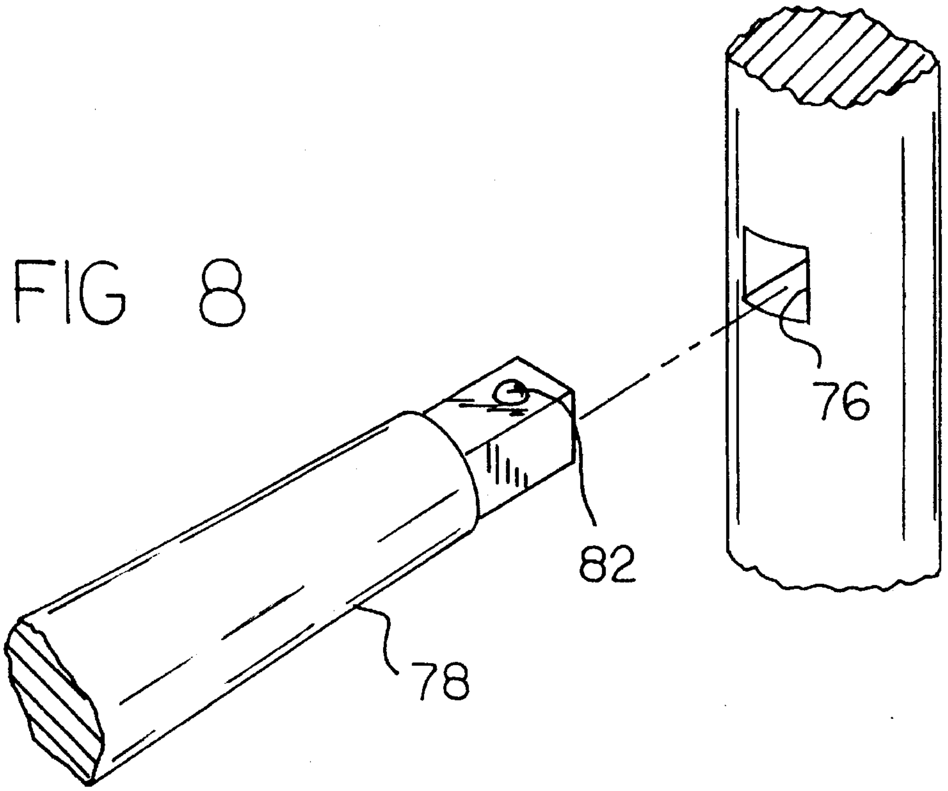
FIG. 8 is an exploded perspective view of yet an alternate embodiment of the invention.

The final embodiment is shown in FIG. 8. In such embodiment, the system 10 includes a further component in the form of an aperture 76 recessed into the C-shaped jaw on the side thereof remote from the parallel legs. Its axis is intermediate of, but parallel with, the parallel legs of the C-shaped member. In addition, the handle 78 is provided. The handle has an interior end 80 with a rectangular cross section. Also formed in the rectangular cross section is a retractable spring urged ball 82. The rectangular cross section and ball are adapted to be removably positioned within the rectangular aperture of the C-shaped member. In this manner, the C-shaped jaw and its associated components may be manipulated from a remote location by a user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ball joint clamp comprising:

a C-shaped clamp having an elongated vertical component at its central extent and having two horizontal parallel legs comprised of an upper leg and a lower leg extending from opposing ends thereof;

a fixed jaw in a U-shaped configuration having parallel legs in a horizontal orientation and a curved coupling section therebetween, the coupling section secured at its interior end to the outboard end of the upper leg, the U-shaped jaw having a horizontal lower surface and an upper surface angling downwardly from its curved coupling section with the interior surface of the U-shaped jaw being chamfered whereby the upper surface of the U-shaped jaw has a smaller surface area on its upper surface than its lower surface with the coupling section being a curve having an axis parallel with the axis of the long leg of the U-shaped member;

a cylindrical member with a threaded central aperture and an exterior surface secured at one edge to the exterior surface of the lower leg of the C-shaped clamp with the axis of the cylindrical member being co-extensive with the axis of the U-shaped member and parallel with the axis of the long leg of the C-shaped member; and a bolt having a thread exterior surface rotatably coupled to the threads of the cylindrical member, the upper end of the threaded bolt being formed with an enlarged disk having a spherical recess facing the U-shaped member and having a head at its lower end rotatable at the discretion of the user, the disk being shaped to contact the free end of a ball joint pin and push it through its supporting aperture;

a handle component having a lower end and an upper end and a leg component with an outboard end and a threaded exterior end adapted to be threadably coupled to the central portion of the elongated vertical component on the side thereof remote from its legs but parallel therewith, the outboard end of the leg component being formed with an aperture positionable to be co-axial with an aperture at the upper end of the handle component, a toothed interface between the upper end of the handle component and the outboard end of the leg component and a bolt with a wing nut adapted to be positioned through the apertures of the handle and leg component for effecting a secure coupling therebetween at a predetermined angle.

* * * * *